July 29, 1941.                R. H. TULL                2,250,557
                    COOLER FOR BOTTLED BEVERAGES
                        Filed Nov. 5, 1938              2 Sheets-Sheet 1

WITNESSES:
H. R. Heintzen
E. H. Lutz

INVENTOR
ROBERT H. TULL
BY
ATTORNEY

July 29, 1941.   R. H. TULL   2,250,557
COOLER FOR BOTTLED BEVERAGES
Filed Nov. 5, 1938   2 Sheets-Sheet 2

WITNESSES:

INVENTOR
ROBERT H. TULL
BY
ATTORNEY

Patented July 29, 1941

2,250,557

UNITED STATES PATENT OFFICE 2,250,557

COOLER FOR BOTTLED BEVERAGES

Robert H. Tull, Springfield, Mass., assignor to Westinghouse Electric & Manufacturing Company, East Pittsburgh, Pa., a corporation of Pennsylvania Application November 5, 1938, Serial No. 239,003

7 Claims. (Cl. 62—102)

This invention relates to a mechanical refrigerator and more especially to a dry cooler for bottled or otherwise packaged beverages.

One object of this invention is to provide a dry cooler for packaged beverages and the like in which the packages are cooled progressively.

Another object is to provide a simple cooler in which the packages of each type of beverage and the like may be segregated and dispensed independently of the others.

These and other objects are effected by my invention as will be apparent from the following description and claims taken in connection with the accompanying drawings, forming a part of this application, in which:

Figure 1:
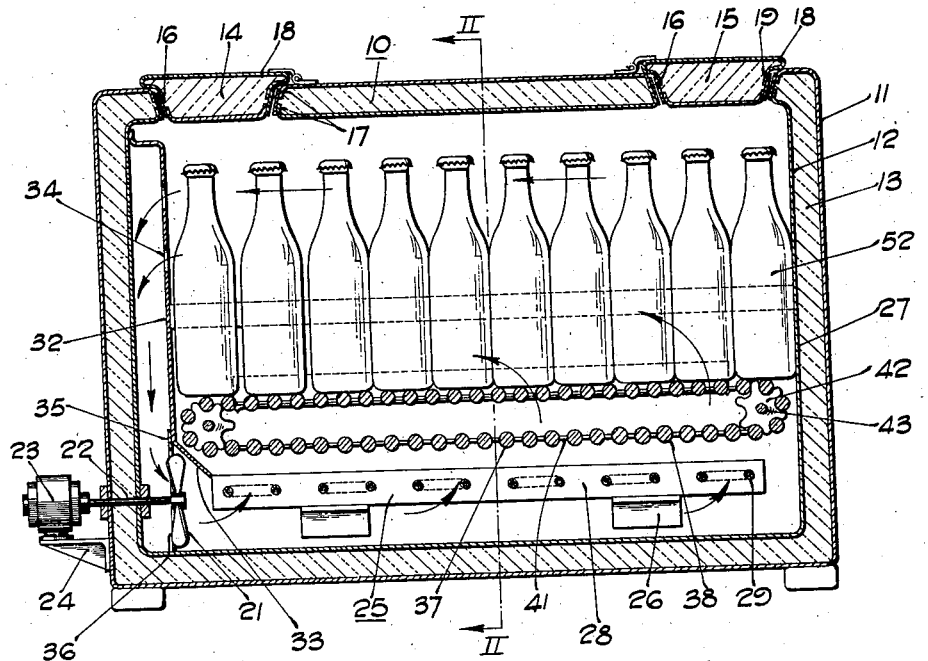
Fig. 1 is a vertical section of the cooler taken on the line I—I of Fig. 2.
Figure 2:
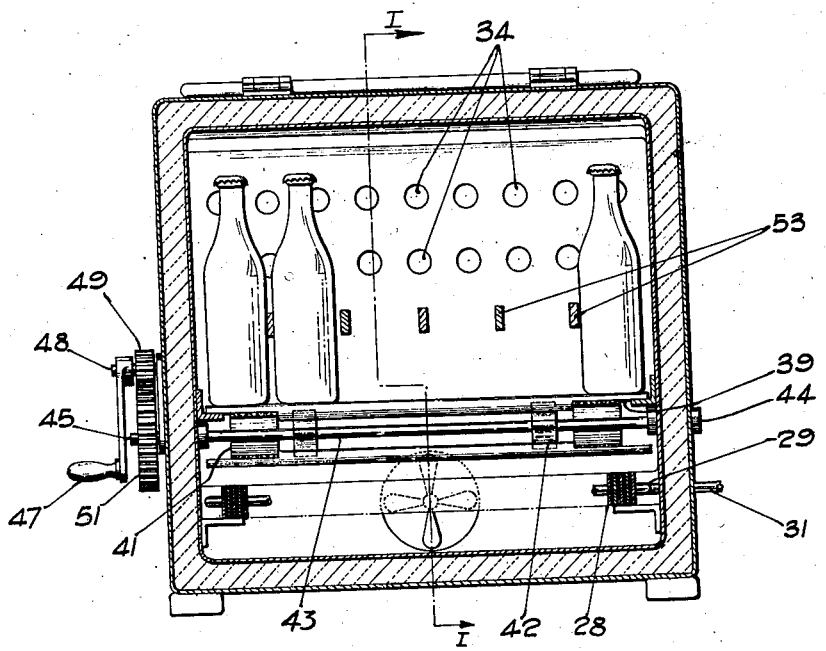
Fig. 2 is a vertical section of the cooler taken on the line II—II of Fig. 1.

Referring now to Figs. 1 and 2, the reference numeral 10 represents a rectangular insulated cabinet comprising an outer casing 11, an inner liner 12, and heat insulating material 13 packed between the outer casing and the inner liner.

Two spaced apart openings 14 and 15 are provided in the top wall of the cabinet 10, one at each end thereof. The edges of the openings 14 and 15 are lined with a heat insulating breaker strip 16 which is secured to the inturned edges 17 of the outer casing 11 and the inner liner 12. The openings are provided with heat insulating closure members 18 of the same general construction as the walls of the cabinet. The edges of the closure members are likewise provided with heat insulating breaker strips 19.

A fan 21 is located on one side and near the bottom of the cabinet 10 and is driven through a shaft 22 by a motor 23 located on a bracket 24 on the exterior of the cabinet 10. An evaporator or cooling unit 25 is supported on brackets 26 between the fan 21 and the opposite side 27 of the cabinet 10 and is elevated somewhat above the floor thereof. The cooling unit 25 comprises parallel and spaced apart metal strips 28 running parallel to the flow of air from the fan 21. These parallel strips 28 provide vertical air ducts through the cooling unit 25. A tube 29 for conducting an evaporative refrigerant is passed back and forth through the parallel strips 28 and this tube may be connected at its ends 31 to a compressor-condenser type refrigerant supplying machine, not shown on the drawings.

A baffle 32 is secured at its upper end to the upper portion of the inner liner 12 comprising the end wall 27 of the cabinet 10 and the lower edge 33 of the baffle 32 is bent inwardly to deflect the air circulated by the fan 21 through the cooling unit 25. The intermediate portion of the baffle 32 is provided with openings 34 for the passage of air. The preferred path of the air circulated by the fan 21 is underneath and through the cooling unit 25, upwardly through the bottle storage space above the cooling unit 25, through the openings in the baffle 34, and then downwardly to the fan 21. The direction of circulated air may be reversed, however. The lower portion of the baffle 32 is joined to a second baffle 35 which is imperforate except for a central opening 36 in which the fan 21 is located. The purpose of the second baffle 35 is to prevent the air from circulating around the fan 21 without passing through the cooling unit 25.

A conveyor apron 37 is located above the cooling unit 25. The apron 37 comprises a series of cylindrical rods 38, the end portions of which are cut out to form half-round sections 39, as shown best in Fig. 2. The flat faces of the half-round sections 39 are secured to two endless flexible belts 41, one of which is located at each end of the rods 38. The cylindrical rods 38 comprising the apron 37 pass over two sets of sprocket wheels 42, one set of which is located near the baffle 32 and the other at the opposite side 27 of the cabinet 10. Each set of sprocket wheels 42 is secured to a shaft 43 adapted to turn in journals 44 secured to the walls of the cabinet 10. One end 45 of one of the shafts 43 passes through the wall of the cabinet 10.

A means for driving the conveyor is provided on the outside of the cabinet. The driving means comprises a handle 47 secured to a shaft 48 journaled in the cabinet wall. A pinion gear wheel 49 secured to the shaft 48 meshes with and drives a larger gear wheel 51 secured to the projecting end 45 of the shaft 43 so that when the handle 47 is turned, the apron 37 is driven through a mechanical advantage.

The operation of the refrigerator as thus far described is as follows: The bottled or otherwise packaged beverages 52 to be cooled are placed on the conveyor apron 37 through the opening 14 and the conveyor apron 37 is moved along by turning the handle 47 to make room for additional bottles. When the bottles 52 strike the side wall 27 of the cabinet 10, the handle 47 is turned through a few additional revolutions. These additional revolutions cause the apron 37 to slide beneath the bottles 52 held stationary by the side wall 27 of the cabinet 10 and forces the remaining bottles 52 on the conveyor tightly against the stationary bottles 52 so that the spaces between the bottles are eliminated and the bottles become tightly stacked. The bottles are preferably moved against the direction of air flow.

The bottles are removed through the opening 15 as sales of the bottled beverages are made. The handle is then turned to move the remaining bottles to the right, as viewed in Fig. 1, and additional bottles are thereupon inserted through the opening and placed on the conveyor.

If desired, guide bars 53 may be secured in the cabinet to keep the bottles 52 in definite rows. The guide bars are secured in the ends walls of the cabinet 10 and run parallel to the direction of movement of the bottles. When so equipped, the cabinet is adapted for the convenient handling of various kinds of bottled beverages. The bottles containing the same kind of beverage are placed in the same rows. If the dispensing of one kind of bottled beverage is more active than that of another, the handle is turned so that the bottles less actively dispensed are held stationary by the end wall and the row of bottles more actively dispensed is advanced towards the opening 15. By this means all of the various kinds of bottled beverages contained in the cooler will be available for dispensing regardless of the difference in the rate at which they are being dispensed.

Figure 3:
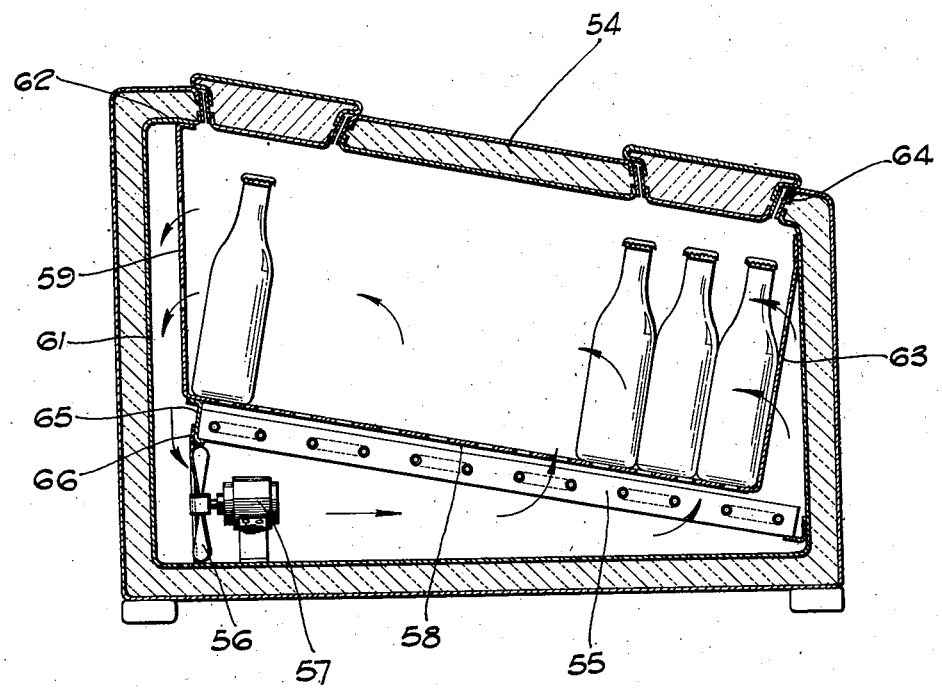
Fig. 3 is a vertical section similar to Fig. 1 but showing a modified form of the invention.

Fig. 3 shows a modification of the invention in which the belt conveyor is replaced by an inclined plane. The cabinet 54, in general construction, is similar to the cabinet shown in Figs. 1 and 2, but its upper wall is inclined downwardly to the right as viewed in Fig. 3. The cooling unit 55 is also of similar construction as the cooling unit 25 shown in Figs. 1 and 2, but is inclined downwardly in a direction parallel to the upper wall of the cabinet 54.

The fan 56 in this modification is driven by a motor 57 located within the cabinet 54. The bottles are supported above the cooling unit 55 on a foraminated metal sheet 58 bent in the general form of a U. One of the legs 59 of the U-shaped sheet 58 is spaced a short distance from the wall 61 of the cabinet and is secured to the upper portion of the liner 62. The other leg 63 of the foraminated sheet 58 is secured to the side wall of the liner adjacent the opening 64. The bottom of the foraminated sheet 58 is located slightly above and parallel to the cooling unit 55 and is connected with one end thereof by means of a bracket 65. A baffle 66 is secured around the fan 56 to insure that the air circulated by the fan 56 passes underneath and through the cooling unit 55.

The action of the cooler of this modification is similar to the action of the cooler shown in Figs. 1 and 2. Guide bars may also be provided in this cooler to segregate the bottles containing the same beverages.

It will thus be apparent that this invention provides a dry bottle cooler in which the bottles are cooled progressively and also provides a cooler of simple construction for progressively cooling and dispensing a plurality of bottled beverages.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a dry cooler for packaged beverages and the like, the combination of an insulated cabinet having side, top, and bottom walls, a substantially flat cooling unit in said cabinet and near, but spaced from the bottom thereof, said cooling unit having air passages, an air baffle near one end of said cooling unit, a motor-driven fan near said baffle for blowing the air in said cabinet underneath said cooling unit and along and through the air passages thereof, the air passing generally upward and through said cabinet and around said baffle to return to said fan, and means for conveying packaged beverages and the like over said cooling unit from the baffle to the end of the cooling unit opposite said baffle, and openings in a wall of said cabinet for placing said packages on the end of said conveying means near the baffle and for removing said packages from the other end of said conveying means.

2. In a dry cooler for packaged beverages and the like, the combination of an insulated chamber having side, top, and bottom walls, a flat, horizontal cooling unit near but spaced from the bottom wall of said chamber, said cooling unit having vertical air passages and an edge near but spaced from one side wall of said chamber, the other edges of said cooling unit extending substantially to the other side walls respectively, an air baffle extending upwardly from said first-named edge, foraminated means for supporting packaged beverages and the like above said cooling unit, said means having provisions for moving said packages from said baffle towards the opposing side wall of said chamber, a door in the top of said chamber for inserting packages to rest on said supporting means near said baffle, a second door for removing packages from the side of the chamber opposite said baffle, and a motor-driven fan for circulating the air in said chamber around said baffle, underneath and through said cooling unit, through the supporting means, and across the bottles which may be resting on said supporting means.

3. In a dry cooler for packaged beverages and the like, the combination of an insulated cabinet having side, top, and bottom walls, a substantially flat cooling unit in said cabinet and near, but spaced from the bottom thereof, said cooling unit having air passages, an air baffle near one end of said cooling unit, a motor-driven fan near said baffle for blowing the air in said cabinet underneath said cooling unit and along and through the air passages thereof, the air passing generally upward and through said cabinet and around said baffle, and a belt conveyor completely in said cabinet for conveying packaged beverages over said cooling unit from the baffle to the end of the cooling unit opposite said baffle, means associated with said belt conveyor for segregating the packages into rows parallel to the direction of motion of said packages, and openings in the wall of said sabinet for placing said packages on the end of said conveyor near the baffle and for removing said packages from the other end of said conveyor.

4. In a dry cooler for packaged beverages and the like, the combination of an insulated cabinet, an opening in said cabinet, a closure for said opening, a cooling unit in said cabinet, a substantially stationary inclined surface in said cabinet for supporting packaged beverages and the like and permitting said packages to slide progressively over said surface and through said cabinet, and a fan for circulating the air in said chamber over said cooling unit and over the packages on said inclined surface.

5. In a dry cooler for packaged beverages and the like, the combination of an insulated cabinet, said cabinet having an access opening, a closure for said opening, a cooling unit for said cabinet, a fan for circulating chilled air from said cooling unit through the interior of said cabinet, a belt in said cabinet for supporting said packages and progressively conveying the same through the cabinet towards said opening, means whereby said belt may be driven, said belt being of a size to support a plurality of said packages in rows in the direction of both the length and the width of the belt, said belt also having a substantially flat upper surface adapting said belt to slide underneath said packages when the same are forcefully retained, and means associated with said cabinet for forcefully retaining said packages adjacent the access opening, whereby on driving said belt, the packages in said cabinet are brought towards said access opening and, on continued driving of said belt after some of the packages are retained adjacent said opening, the remaining packages in the cabinet are moved towards the retained packages to fill in the voids which may exist between the retained and the movable packages, said packages being free to move sidewardly on said belt to fill in the voids lying slightly to one side of their natural direction of travel.

6. In a dry cooler for packaged beverages and the like, the combination of an insulated cabinet, said cabinet having an access opening, a closure for said opening, a cooling unit for said cabinet, a fan for circulating chilled air from said cooling unit through the interior of said cabinet, a belt in said cabinet for supporting said packages and progressively conveying the same through the cabinet toward said opening, means whereby said belt may be driven, said belt being of a size to support a plurality of said packages in rows in the direction of both the length and the width of said belt, said belt having also an upper surface adapting said belt to slide underneath said packages when the same are forcefully retained, means associated with said cabinet for forcefully retaining said packages adjacent the access opening, and spacing devices between adjacent rows parallel to the direction of movement of said belt, whereby on driving said belt, the packages in said cabinet are brought toward said access opening and, on continuing driving of said belt after some of the packages are retained adjacent said opening, the remaining packages in the cabinet are moved towards the retained packages each in its proper row to fill in the voids which may exist between the movable and the retained packages.

7. In a dry cooler for packaged beverages and the like, the combination of an insulated cabinet, said cabinet having an access opening, a closure for said opening, a cooling unit for said cabinet, a fan for circulating chilled air from said cooling unit through the interior of said cabinet, a smooth, inclined platform in said cabinet for supporting said packages and tending to move them towards said access opening, means associated with said cabinet for retaining said packages adjacent said access opening and against downward movement along said platform, whereby the downward movement of said packages tends to fill in the voids at the lower portion of said platform, said packages being free to slide both downwardly and transversely on said platform.

ROBERT H. TULL.